(12) United States Patent
Hara et al.

(10) Patent No.: US 11,401,421 B2
(45) Date of Patent: Aug. 2, 2022

(54) ADDITION-CURABLE SILICONE RUBBER COMPOSITION

(71) Applicant: SHIN-ETSU CHEMICAL CO., LTD., Tokyo (JP)

(72) Inventors: Tatsuei Hara, Annaka (JP); Ryo Ashida, Annaka (JP); Hidenori Mizushima, Annaka (JP); Shigeru Ubukata, Annaka (JP); Nobu Kato, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 200 days.

(21) Appl. No.: 16/608,370

(22) PCT Filed: Apr. 13, 2018

(86) PCT No.: PCT/JP2018/015567
§ 371 (c)(1),
(2) Date: Oct. 25, 2020

(87) PCT Pub. No.: WO2018/198830
PCT Pub. Date: Nov. 1, 2018

(65) Prior Publication Data
US 2021/0108079 A1  Apr. 15, 2021

(30) Foreign Application Priority Data

Apr. 26, 2017 (JP) .............. JP2017-087222
Aug. 2, 2017 (JP) .............. JP2017-150039

(51) Int. Cl.
C08G 77/12 (2006.01)
C08L 83/04 (2006.01)
(Continued)

(52) U.S. Cl.
CPC .............. *C08L 83/04* (2013.01); *C08G 77/08* (2013.01); *C08G 77/12* (2013.01); *C08G 77/20* (2013.01);
(Continued)

(58) Field of Classification Search
CPC ...... C08G 77/12; C08G 77/20; C08G 77/045; C08G 77/80; C08L 83/04; B01J 23/40
See application file for complete search history.

(56) References Cited

FOREIGN PATENT DOCUMENTS

EP   0 652 256 A2   11/1994
JP   6-16938 A      1/1994
(Continued)

OTHER PUBLICATIONS

Evonik (https://products-re.evonik.com/www2/uploads/productfinder/AEROSIL-200-EN.pdf)(date unknown).*
(Continued)

*Primary Examiner* — Kuo Liang Peng
(74) *Attorney, Agent, or Firm* — Birch, Stewart, Kolasch & Birch, LLP

(57) ABSTRACT

The purpose of the present invention is to provide an addition-curable silicone rubber composition which gives a cured product having a controlled oil-bleeding property and releasability from a mold, without increasing an amount of a bleeding oil to be added.

Thus, the present invention provides an addition-curable silicone rubber composition comprising the following components (A) to (D):

(A) 100 parts by mass of an organopolysiloxane having at least two alkenyl groups each bonded to a silicon atom,
(B) 0.2 to 20 parts by mass of an organohydrogenpolysiloxane having at least two hydrogen atoms each bonded to a silicon atom,
(C) a catalytic amount of a platinum group metal catalyst, and
(D) 1 to 10 parts by mass of a silicone oil represented by the following formula (1):

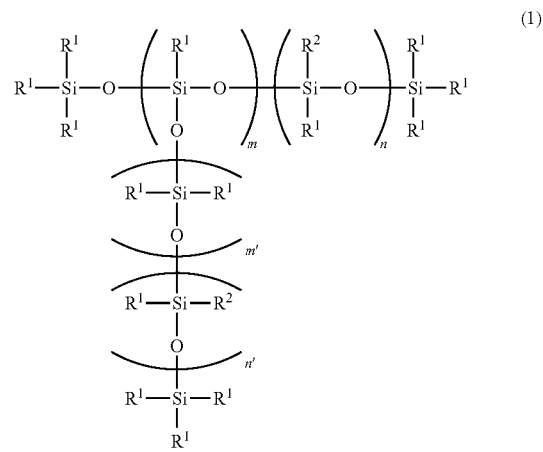

wherein $R^1$ is, independently of each other, an unsubstituted monovalent hydrocarbon group having 1 to 10 carbon atoms, $R^2$ is, independently of each other, a monovalent aromatic hydrocarbon group having 6 to 12 carbon atoms, the amount of the monovalent aromatic hydrocarbon group is at least 35 mol % and less than 50 mol %, relative to a total amount of all substituents each bonded to a silicon atom, that is, all of $R^1$ and $R^2$, m is an integer of from 0 to 3, m' is an integer of from 0 to 3, n' is an integer of from 0 to 3, n is an integer of from 10 to 20, and m+m'+n+n' is in a range of from 10 to 22.

5 Claims, 1 Drawing Sheet

(51) Int. Cl.
*C08G 77/08* (2006.01)
*C08G 77/20* (2006.01)
*C08G 77/00* (2006.01)
*C08K 3/36* (2006.01)

(52) U.S. Cl.
CPC ............... *C08G 77/80* (2013.01); *C08K 3/36* (2013.01); *C08K 2201/006* (2013.01); *C08L 2203/30* (2013.01); *C08L 2205/025* (2013.01); *C08L 2205/03* (2013.01)

(56) References Cited

FOREIGN PATENT DOCUMENTS

| JP | 6-93186 A | 4/1994 |
|----|-----------|--------|
| JP | 7-126531 A | 5/1995 |
| JP | 8-269338 A | 10/1996 |
| JP | 08269338 | * 10/1996 |
| JP | 11-43608 A | 2/1999 |
| JP | 2001-342349 A | 12/2001 |
| JP | 2004-75813 A | 3/2004 |
| JP | 2009-185254 A | 8/2009 |

OTHER PUBLICATIONS

International Search Report issued in PCT/JP2018/015567 (PCT/ISA/210), dated Jul. 17, 2018.
Written Opinion of the International Searching Authority issued in PCT/JP2018/015567 (PCT/ISA/237), dated Jul. 17, 2018.

* cited by examiner

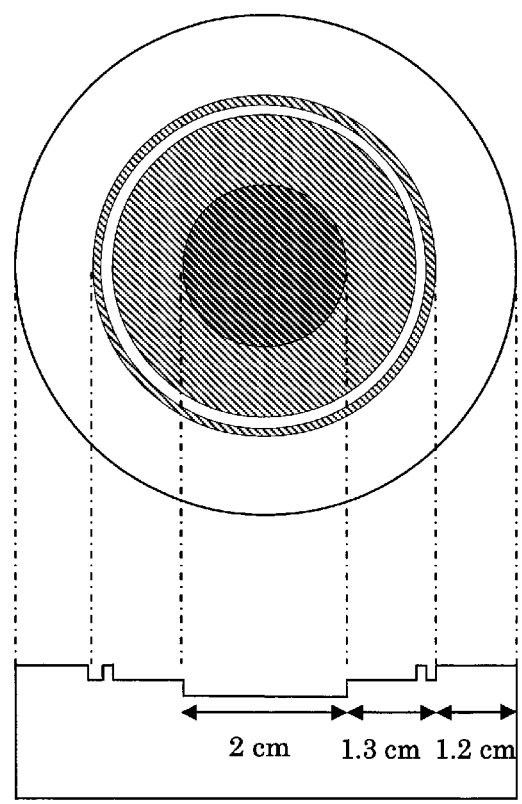

ADDITION-CURABLE SILICONE RUBBER COMPOSITION

FIELD OF THE INVENTION

The present invention relates to an addition-curable silicone rubber composition. More specifically, the present invention relates to an addition-curable silicone rubber composition which provides a molded product having a good oil-bleeding property and controlled releasability from a mold.

BACKGROUND OF THE INVENTION

Silicone rubber has been used widely in a variety of fields such as building materials, electric or electronic parts, automobile parts and OA device parts because of its excellent heat resistance, weather resistance, durability, and electrical properties. Silicone rubber has been used widely as particularly automobile parts, such as oil seals, packings or rubber stoppers in wire connector parts, O-rings, and grommets for diaphragms or distributors. These parts need to have workability in assembling, and a hermetical sealing property, waterproof property, and insulation property after assembled, particularly in the fields of connectors and grommets for distributors. It is known that a silicone rubber which provides a molded product having good oil-bleeding on a surface is effective in the aforesaid applications and has been used widely.

Molded silicone rubber products is obtained by molding a silicone rubber composition into a desired shape according to a conventional molding method such as compression molding, transfer molding or injection molding, followed by curing according to a conventional method. Most of molded products have a complicated and small shape and, moreover, from tens to hundreds of molded products are manufactured at once in a single molding. When an amount of a bleeding component added is small, problems may occur, such that release from a mold just after molding is not easy to cause poor workability and that functions such as insertion property or waterproof property of a molded product are poor.

It might be considered to increase an amount of the bleeding component in order to solve the aforementioned problems. Then, the bled amount of the bleeding component on a surface of the molded product is too much large to cause a dirty surface of the mold, insufficient cure of the composition and poor transparency in the product. There are methods where a release agent is applied on a surface of a mold or a release agent is incorporated in a silicone rubber composition in order to improve the releasability from the mold. However, the mold release agent may cause contamination.

A mold may be washed periodically to prevent a dirty surface of the mold. However, for washing a mold in a production line, the mold should be unmounted from a molding machine, cooled to room temperature, washed with a chemical, solvent or the like, re-mounted on the molding machine, and heated and left until a temperature of the mold becomes stable at a molding temperature. Therefore, a production efficiency is so poor as largely hinder the production.

JP application Laid-Open No. Hei6(1994)-16938 (Patent Literature 1) describes an oil-bleeding silicone rubber composition comprising an organopolysiloxane having specific amounts of a hydroxyl group and a phenyl group. JP application Laid-Open No. Hei6(1994)-93186 (Patent Literature 2) describes an bleeding silicone rubber composition comprising two types of bleeding oils, a phenyl silicone oil and a low molecular weight silicone oil. JP application Laid-Open No. 2009-185254 (Patent Literature 3) describes an oil-bleeding silicone rubber composition with a less amount of a low molecular component. These patent literature refer to the oil-bleeding property and mold surface-soiling property (processability) of the oil-bleeding silicone rubber compositions, but do not refer to releasability from a mold just after molding.

PRIOR LITERATURE

Patent Literature

Patent Literature 1: JP application Laid-Open No. Hei6 (1994)-16938

Patent Literature 2: JP application Laid-Open No. Hei6 (1994)-93186

Patent Literature 3: JP application Laid-Open No. 2009-185254

SUMMARY OF THE INVENTION

Problems to be Solved by the Invention

In view of the aforesaid circumstances, the purpose of the present invention is to provide an addition-curable silicone rubber composition which gives a cured product having a controlled oil-bleeding property and releasability from a mold, without increasing an amount of a bleeding oil to be added.

Means for Solving the Problems

The present inventors have made research and found that an addition-curable silicone rubber composition comprising a specific amount of a phenyl group-containing organopolysiloxane represented by the following formula (1) provides a molded product having a good oil-bleeding property and releasability from a mold and further found that, the oil-bleeding property is controlled by introducing a branched structure in the organopolysiloxane.

Thus, the present invention provides an addition-curable silicone rubber composition comprising the following components (A) to (D):

(A) 100 parts by mass of an organopolysiloxane having at least two alkenyl groups each bonded to a silicon atom, (B) 0.2 to 20 parts by mass of an organohydrogenpolysiloxane having at least two hydrogen atoms each bonded to a silicon atom, (C) a catalytic amount of a platinum group metal catalyst, and (0) 1 to 10 parts by mass of a silicone oil represented by the following formula (1):

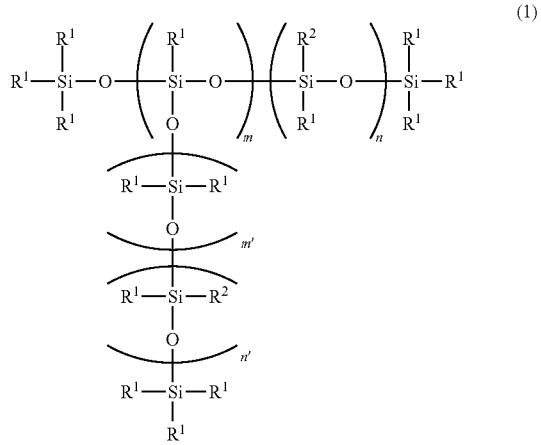

wherein $R^1$ is, independently of each other, an unsubstituted monovalent hydrocarbon group having 1 to 10 carbon atoms, $R^2$ is, independently of each other, a monovalent aromatic hydrocarbon group having 6 to 12 carbon atoms, the amount of the monovalent aromatic hydrocarbon group is at least 35 mol % and less than 50 mol %, relative to a total amount of all substituents each bonded to a silicon atom, that is, all of $R^1$ and $R^2$, m is an integer of from 0 to 3, m' is an integer of from 0 to 3, n' is an integer of from 0 to 3, n is an integer of from 10 to 20, and m+m'+n+n' is in a range of from 10 to 22.

The present invention preferably provides an addition-curable silicone rubber composition comprising the following components (A) to (D):

(A) 100 parts by mass of an organopolysiloxane having at least two alkenyl groups each bonded to a silicon atom, (B) 0.2 to 20 parts by mass of an organohydrogenpolysiloxane having at least two hydrogen atoms each bonded to a silicon atom, (C) a catalytic amount of a platinum group metal catalyst, and (D) 1 to 10 parts by mass of a silicone oil represented by the following formula (1'):

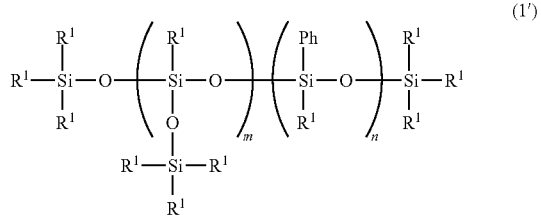

wherein, R' is, independently of each other, an unsubstituted monovalent hydrocarbon group having 1 to 10 carbon atoms, Ph is a phenyl group, the amount of the phenyl group is at least 35 mol % and less than 50 mol %, relative to a total amount of all substituents each bonded to a silicon atom, that is, all of $R^1$ and Ph, m is an integer of from 0 to 3, n is an integer of from 10 to 20, and m+n is in a range of from 10 to 22.

Effects of the Invention

The addition-curable silicone rubber composition according to the present invention provides a molded product having a good oil-bleeding property and good releasability from a mold. Further, the oil-bleeding property of the molded product are controllable by changing the amount of the phenyl group and the length of the siloxane chain, and introducing the branched structure, so that a time and an amount of oil-bleeding on the surface of a molded product can be controlled.

BRIEF DESCRIPTION OF THE DRAWING

FIG. 1 shows a plan view and a front view of a concentric concave mold which presences in a bottom of a peel strength evaluation device.

BEST MODE OF THE INVENTION

The present invention will be described below in detail.
[(A) Alkenyl Group-Containing Organopolysiloxane]
Component (A) is an organopolysiloxane having at least two alkenyl groups each bonded to a silicon atom. The organopolysiloxane is a main agent (base polymer) of the present composition. Any alkenyl group-containing organopolysiloxane conventionally used for addition curable silicone rubber compositions may be used.

The organopolysiloxane has at least two alkenyl groups bonded to a silicon atom. The organopolysiloxane has an alkenyl group in an amount falling within a range of preferably from $1.0\times10^{-6}$ mol/g to $3.0\times10^{-3}$ mol/g, more preferably from $1.0\times10^{-5}$ mol/g to $2.0\times10^{-3}$ mol/g. If the amount of the alkenyl group is smaller than the aforesaid lower limit, the composition may become a gel because of having a too low rubber hardness. If the amount of the alkenyl group is larger than the aforesaid upper limit, rubber elasticity is not seen in a cured product because of excessively high crosslink density and hardness. The alkenyl group in the organopolysiloxane may bond to a silicon atom at the end of its molecular chain, a silicon atom in a mid-point (not at the end) of the molecular chain, or both of them.

The organopolysiloxane has an average degree of polymerization of preferably from 100 to 50,000, more preferably from 150 to 20,000. If the average degree of polymerization is smaller than the aforesaid lower limit, a cured product obtained may not have sufficient rubber physical properties. If the average degree of polymerization is larger than the aforesaid upper limit, a viscosity of the composition is high so that molding is difficult.

An average degree of polymerization in the present invention is a number-average degree of polymerization reduced to polystyrene in gel permeation chromatography (GPC) analysis using toluene as a developing solvent in the following conditions.
[GPC Determination Conditions]
Developing solvent: tetrahydrofuran (THF)
Flow rate: 0.6 mL/min
Detector: differential refractive index detector (RI)
Column: TSK Guardcolumn Super H-L
TSKgel SuperH4000 (6.0 mm I.D.×15 cm×1)
TSKgel SuperH3000 (6.0 mm I.D.×15 cm×1)
TSKgel SuperH2000 (6.0 mm I.D.×15 cm×2) (all, ex TOSOH)
Column temperature: 40° C.

Injection amount of a sample: 20 μL (THF solution having a concentration of 0.5 wt %)

The organopolysiloxane (A) is represented, for example, by the following average compositional formula (2):

$$R^3{}_aSiO_{(4-a)/2} \qquad (2)$$

wherein $R^3$ is, independently of each other, an unsubstituted or substituted, monovalent hydrocarbon group having 1 to 10 carbon atoms, preferably 1 to 8 carbon atoms, at least two of $R^3$ are an alkenyl group, and a is a positive number of from 1.5 to 2.8, preferably from 1.8 to 2.5, and more preferably from 1.95 to 2.05. The organopolysiloxane preferably has the above-described average degree of polymerization.

In the formula (2), examples of the unsubstituted or substituted monovalent hydrocarbon group represented by $R^3$ include alkyl groups such as a methyl group, an ethyl group, a propyl group, an isopropyl group, a butyl group, an isobutyl group, a tert-butyl group, a pentyl group, a neopentyl group, a hexyl group, a cyclohexyl group, an octyl group, a nonyl group and a decyl group; aryl groups such as a phenyl group, a tolyl group, a xylyl group, and a naphthyl group; aralkyl groups such as a benzyl group, a phenylethyl group, and a phenylpropyl group, and alkenyl groups such as a vinyl group, an allyl group, a propenyl group, an isopropenyl group, a butenyl group, a hexenyl group, a cyclohexenyl group, and an octenyl group; and those groups in which a part or the whole of the hydrogen atoms is replaced with, for example, a halogen atom such as fluorine, bromine, or chlorine atom, or a cyano group, such as a chloromethyl, chloropropyl, boromoethyl, trifluoropropyl, or cyanoethyl group. It is preferred that 90 mol % or more of $R^3$ is a methyl group.

In the formula (2), at least two of $R^3$ are an alkenyl group. The alkenyl group has preferably 2 to 8 carbon atoms, more preferably 2 to 6 carbon atoms, and is particularly a vinyl group.

The organopolysiloxane is preferably a linear diorganopolysiloxane having a main chain composed of repetition of diorganosiloxane unit ($R^3{}_2SiO_{2/2}$) with both terminals capped with a triorganosiloxy group ($R^3{}_3SiO_{1/2}$). The organopolysiloxane may partially comprise a branched chain structure having a monoorganosilsesquioxane unit ($R^3SiO_{3/2}$), wherein $R^3$ is as defined above, or a cyclic structure.

Examples of the organopolysiloxane (A) include diorganopolysiloxane whose both terminals are capped with a diorganoalkenylsiloxy group, diorganopolysiloxanes whose both terminals are capped with an organodialkenylsiloxy group, diorganopolysiloxanes whose both terminals are capped with a trialkenylsiloxy group, a copolymer of a diorganosiloxane and an organoalkenylsiloxane with both terminals of the copolymer being capped with a triorganosiloxy group, a copolymer of a diorganosiloxane and an organoalkenylsiloxane with both terminals of the copolymer being capped with a diorganoalkenylsiloxy group, and a copolymer of a diorganosiloxane and an organoalkenylsiloxane with one terminal of the copolymer being capped with a diorganoalkenylsiloxy group and the other terminal is capped with a triorganosiloxy group. Among these, diorganopolysiloxane with both terminals of the copolymer being capped with a diorganoalkenylsiloxy group, a copolymer of a diorganosiloxane and an organoalkenylsiloxane with both terminals of the copolymer being capped with a triorganosiloxy group, and a copolymer of a diorganosiloxane and an organoalkenylsiloxane with both terminals of the copolymer being capped with a diorganoalkenylsiloxy group are preferred. The term "organo" aforementioned for the siloxanes means an unsubstituted or substituted monovalent hydrocarbon group described for $R^3$ in the formula (2), except aliphatic unsaturated groups such as an alkenyl group.

[(B) Organohydrogenpolysiloxane]

Component (B) is an organohydrogenpolysiloxane having at least two, preferably three or more, hydrogen atoms each bonded to a silicon atom (i.e., SiH groups). The organohydrogenpolysiloxane functions as a curing agent (crosslinking agent) for curing the composition. A hydrosilylation addition reaction of the SiH group in component (B) with the alkenyl group in component (A) occurs and thereby the composition is crosslinked to be cured.

Component (B) may be a known organohydrogenpolysiloxane conventionally comprised in an addition-curable organopolysiloxane composition. The organohydrogenpolysiloxane has at least two, preferably three or more, more preferably 3 to 100, further more preferably 4 to 50, hydrogen atoms each bonded to a silicon atom (i.e., SiH groups).

The organohydrogenpolysiloxane preferably has the SiH group in an amount of from 0.0005 mol/g to 0.020 mol/g, particularly preferably from 0.001 mol/g to 0.017 mol/g. If the amount of the SiH group is smaller than the aforesaid lower limit, crosslinking may be insufficient. If the amount of the SiH group is larger than the aforesaid upper limit, volatility of the organohydrogenpolysiloxane is higher and, therefore, a portion of the organohydrogenpolysiloxane may volatilize from the composition during mixing or storing the composition.

The organohydrogenpolysiloxane preferably has 2 to 300, particularly preferably from 3 to 150, most preferably 4 to 100 silicon atoms and is in a liquid form at room temperature (25 degrees C.). The hydrogen atom bonded to a silicon atom may be present either at the ends of the molecular chain or in the mid-part (not at the end) of the molecular chain, or it may be present at both. The organohydrogenpolysiloxane may have linear, cyclic, branched, and three-dimensional network molecular structures.

The organohydrogenpolysiloxane (B) is represented, for example, by the following average compositional formula (3):

$$R^4{}_bH_cSiO_{(4-b-c)/2} \qquad (3)$$

wherein $R^4$ is, independently of each other, an unsubstituted or substituted monovalent hydrocarbon group having 1 to 10, preferably 1 to 8, carbon atoms, b is a positive number of from 0.7 to 2.1, c is a positive number of from 0.001 to 1.0, and b+c is a positive number of from 0.8 to 3.0. The organohydrogenpolysiloxane preferably has a hydrogen atom bonded to a silicon atom (SiH group) in the afore mentioned amount and has the afore mentioned number of silicon atoms.

Examples of the monovalent hydrocarbon group represented by $R^4$ in the formula (3) include groups those described for $R^3$. Among these, groups having no aliphatic unsaturated bond are preferred.

In the formula (3), b is a positive number of from 0.7 to 2.1, preferably from 0.8 to 2.0, c is a positive number of from 0.001 to 1.0, preferably from 0.01 to 1.0, and b+c is 0.8 to 3.0, preferably 1.0 to 2.5.

Examples of the organohydrogenpolysiloxane (B) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, a methylhydrogensiloxane-dimethylsiloxane cyclic copolymer, methylhydrogenpolysiloxane whose both terminals are capped with trimethylsiloxy groups, a copolymer between dimethylsiloxane and methylhydrogensiloxane with both terminals of the copolymer being capped with trimethylsiloxy groups, dimethylpolysiloxane whose both terminals are capped with dimethylhydrogensiloxy groups, a copolymer of dimethylsiloxane and methylhydrogensiloxane with both terminals of the copolymer being capped with dimethylhydrogensiloxy groups, a copolymer of methylhydrogensiloxane and diphenylsiloxane with both terminals of the copolymer being capped with trimethylsiloxy groups, a copolymer of methylhydrogensiloxane, diphenylsiloxane and dimethylsiloxane with both terminals of the copolymer being capped with trimethylsiloxy groups, a copolymer of methylhydrogensiloxane, methylphenylsiloxane and dimethylsiloxane with both terminals of the copolymer being capped with trimethylsiloxy groups, a copolymer of methylhydrogensiloxane, dimethylsiloxane and diphenylsiloxane with both terminals of the copolymer being capped with dimethylhydrogensiloxy groups, a copolymer of methylhydrogensiloxane, dimethylsiloxane and methylphenylsiloxane with both terminals of the copolymer being capped with dimethylhydrogensiloxy groups, a copolymer composed of $(CH_3)_2HSiO_{1/2}$ units, $(CH_3)_3SiO_{1/2}$ units and $SiO_{4/2}$ units, a copolymer composed of $(CH_3)_2HSiO_{1/2}$ units and $SiO_{4/2}$ units, and a copolymer composed of $(CH_3)_2HSiO_{1/2}$ units, $SiO_{4/2}$ units, and $(C_6H_5)SiO_{3/2}$ units; and those in which that some or all of the methyl groups is replaced with another alkyl group or a phenyl group.

The organohydrogenpolysiloxane (B) may also contain a polyvalent, particularly divalent to tetravalent, hydrocarbon skeleton having an aromatic ring, such as a phenylene skeleton, a bisphenylene skeleton, a bis(phenylene)ether skeleton, a bis(phenylene)methane skeleton, a 2,2-bis(phenylene)propane skeleton, and a 2,2-bis(phenylene)hexafluoropropane skeleton in a part of the siloxane backbone skeleton (—Si—O—Si—), usually at a part of the positions which an oxygen atom forming a siloxane bond occupies usually.

The amount of component (B) is 0.2 to 20 parts by mass, preferably 0.3 to 10 parts by mass, relative to 100 parts by mass of component (A). A molar ratio of the hydrogen atoms each bonded to a silicon atom (SiH group) in component (B) to a total amount of the alkenyl groups each bonded to a silicon atom in components (A) and (B) (particularly, in component (A)), that is an SiH group/alkenyl group ratio, is preferably 0.8 to 10, particularly 1.0 to 5. If the ratio is smaller than 0.8, the rubber obtained may be sticky due to insufficient curing (less crosslink density). If the ratio is larger than 10, a silicone rubber molded product may contain bubbles therein or may have difficulty in release from a mold.

[(C) Platinum Group Metal Catalyst]

Component (C) is an addition reaction catalyst. Any platinum group metal catalysts known as an addition reaction catalyst may be used. Examples of the platinum group metal catalysts include platinum black, platinic chloride, chloroplatinic acid, a reaction product of chloroplatinic acid and a monohydric alcohol, a complex of chloroplatinic acid and an olefin, and platinum bisacetoacetate.

The amount of the platinum group metal catalyst may be a catalytic amount. The catalytic amount means an amount effective for the addition reaction of component (A) and component (B) to proceed. Generally, the amount of the platinum group metal element is preferably from 0.5 to 1,000 mass ppm, particularly preferably from 1 to 500 mass ppm, relative to the total mass of the components (A) to (Ti).

[(D) Silicone Oil]

Component (D) is a silicone oil represented by the following formula (1). The present composition is characterized in that the composition comprises component (D) in addition to components (A), (B), and (C). In the composition of the present invention, component (D) functions as a bleeding oil. Component (D) has the specific amount of a monovalent aromatic hydrocarbon group and the specific siloxane chain length and, thereby, the molded product obtained by curing the composition has a good oil-bleeding property and good releasability from a mold.

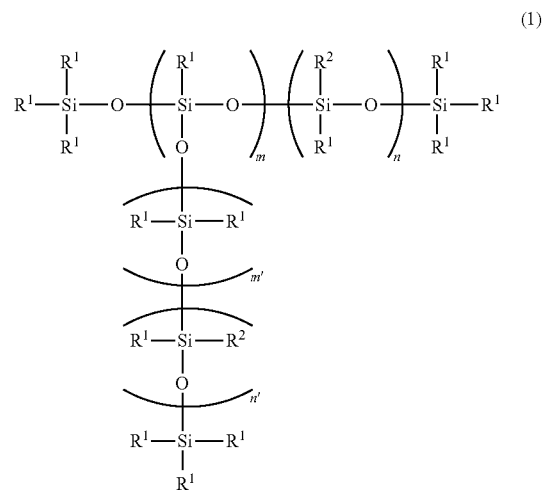

(1)

The silicone oil of the present invention is characterized in that it has a monovalent aromatic hydrocarbon group in an amount of at least 35 mol % and less than 50 mol %, preferably at least 35 mol % and less than 43 mol %, relative to the total amount of all of the substituents each bonded to a silicon atom, that is, all of $R^1$ and $R^2$. If the amount of the monovalent aromatic hydrocarbon group is less than the aforesaid lower limit, a bleeding property is poor. If the amount of the monovalent aromatic hydrocarbon group is larger than the aforesaid upper limit, silicone oil tends to crystallize and a bleeding property is poor.

In the formula (1), m is an integer of from 0 to 3, m' is an integer of from 0 to 3, n' is an integer of from 0 to 3, n is an integer of from 10 to 20, and m+m'+n+n' is in a range of from 10 to 22. Preferably, m is 0, 1, or 2, m' and n' are, independently of each other, 0 or 1, n is from 11 to 20, and m+m'+n+n' is from 13 to 22. More preferably, both m' and n' are 0. When m exceeds 3, the affinity of the silicone oil (which may also be called "bleeding oil", hereinafter) with the base polymer is high, leading to deterioration in an oil-bleeding property in the initial stage of molding and in releasability from a mold. If the length of the siloxane chain (that is, the sum of m+m'+n+n') is shorter than the aforesaid lower limit, the silicone oil dissolves in the base polymer, so as not to attain a bleeding property. If the length of the silicone chain (m+m'+n+n') is longer than the aforesaid upper limit, a bleeding property deteriorates because the silicone oil gets preferentially entangled with the base polymer. By thus specifying the length of the siloxane chain of the silicone oil, the silicone oil and the base polymer acquire well-balanced incompatibility, and improved bleeding is attained on account of their repulsive force. The entanglement degree between the base polymer and the silicone oil (bleeding oil) is controlled by controlling the length of the silicone chain, and thereby the oil-bleeding property (bleeding degree or each bleeding of the oil) can be controlled. m may be 0. The silicone oil has a branched structure with m of 1 or larger and, thereby, an amount of a bled oil or an oil bleed-starting time from a molded product (cured product) in the initial stage of molding can be controlled. As described above, the composition comprising the silicone oil according to the present invention provides a molded product (cured product) having a good oil-bleeding property on the surface thereof and improved releasability from a mold.

In the above formula (1), $R^1$ is, independently of each other, an unsubstituted monovalent hydrocarbon group having 1 to 10 carbon atoms, preferably 1 to 3 carbon atoms. Examples of the monovalent hydrocarbon group include alkyl groups such as a methyl, ethyl, propyl, isopropyl, butyl, isobutyl, tert-butyl, pentyl, neopentyl, hexyl, cyclohexyl, octyl, nonyl or decyl group. Among these, a methyl group is preferred. $R^2$ is, independently of each other, a monovalent aromatic hydrocarbon group having 6 to 12, preferably 6 to 10 carbon atoms. Examples of the monovalent aromatic hydrocarbon group include aryl groups such as a phenyl or tolyl group, and aralkyl groups such as a benzyl or 2-phenylethyl group. Among these, a phenyl group is preferred. It is preferred that $R^1$ and $R^2$ do not have a functional group participating in a crosslinking reaction, such as an aliphatic unsaturated group, for instance, an alkenyl group. When the silicone oil does not participate in the addition reaction between components (A) and (B), it smoothly bleeds from the cured product.

The silicone oil of the present invention is also characterized in that it does not have a diorganosiloxy unit (D unit) having no monovalent aromatic hydrocarbon group, such as, for instance, a dimethylsiloxy unit. Then, a polarity of the silicone oil differs from that of the base polymer and, thereby, the silicone oil bleeds easily out on the surface of the cured product to function suitably as a bleeding oil.

The amount of component (D) is 1 to 10 parts by mass, preferably 3 to 8 parts by mass, relative to 100 parts by mass of component (A). If the amount is less than the aforesaid lower limit, the oil bleeding is insufficient. If the amount is larger than the aforesaid upper limit, physical properties of the cured product may deteriorate or soiling of a mold may occur in molding.

The silicone oil is more preferably one represented by the following formula (1').

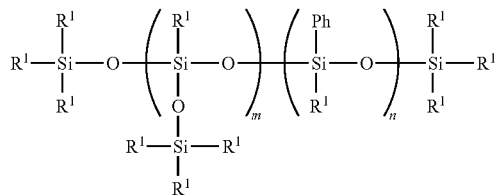

wherein $R^1$ is as defined above, Ph is a phenyl group, the amount of the phenyl group is at least 35 mol % and less than 50 mol %, preferably at least 35 mol % and less than 43 mol %, relative to a total amount of the substituents each bonded to a silicon atom, that is, all of $R^1$ and Ph, m and n are as defined above, and m+n is in a range of from 10 to 22, preferably from 13 to 22.

Examples of such a silicone oil include compounds represented by any one of the following formulas.

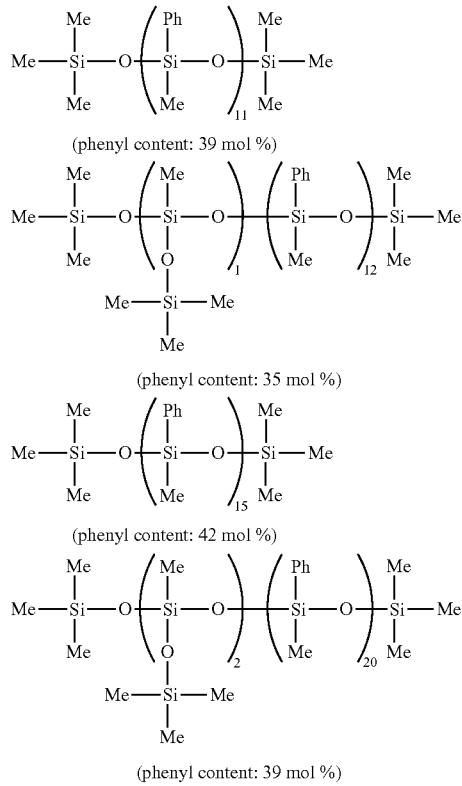

wherein Me is a methyl group and Ph is a phenyl group.

The silicone oil represented by the formula (1) can be produced by any known method, for example, the method described in Japanese Patent No. 5,855,552. Specifically, an organosiloxane having hydroxyl groups each bonded to a silicon atom at the both terminals is subjected to a condensation reaction in the presence of a catalyst and, then, the both ends of the resulting silicone compound are capped with trimethylchlorosilane to thereby obtain the silicone oil. The silicone oil having a branched structure can be obtained by subjecting an organodisiloxane having two hydrolyzable groups both bonded to a silicon atom at one end as a raw material for introducing a branched chain to a condensation reaction with an organosiloxane having a hydroxyl group bonded to a silicon atom at the both terminals in the presence of a catalyst and, then, the both ends of the resulting silicone compound are capped with trimethylchlorosilane to thereby obtain the silicone oil. The catalyst used in the condensation reaction may be any of acid catalysts, basic catalysts, and metal compound catalysts.

[(E) Reinforcing Filler]

The present silicone rubber composition further preferably comprises a reinforcing filler (E) in addition to the components (A) to (D). Any known reinforcing filler may be used. Reinforcing silica fine powder is preferred. The reinforcing silica fine powders may be of any kind of silica, such as reinforcing agent for rubber, such as conventional silicone rubber compositions. Preferred are reinforcing silica fine powder having a BET specific surface area of 50 m²/g or more, preferably 50 to 400 m²/g, more preferably 100 to 350 m²/g. For example, precipitated silica (wet silica), fumed silica (dry silica), and pyrogenic silica are preferred. Fumed silica is particularly preferred for improved rubber strength.

The reinforcing silica fine powder may be silica which may be surface-treated for hydrophobicity. Examples of a surface treating agent include (usually, hydrolyzable) organosilicon compounds such as chlorosilane, alkoxysilane and organosilazane. The silica fine powder may be one subjected to surface hydrophobic treatment with a surface treating agent in a form of powder. Alternatively, a surface treating agent is added during mixing of the alkenyl group-containing organopolysiloxane (A) with the reinforcing silica power to thereby make the surface of the powder hydrophobic.

The surface treatment may be performed according to any conventional method. For example, untreated silica fine powder and a treating agent are placed in a close mechanical kneading device in normal pressure or in a fluidized bed, followed by mixing at room temperature or under heating, if necessary, in an atmosphere of an inert gas. The treatment may be accelerated by a catalyst (hydrolysis accelerator or the like). The treated silica fine powder may be dried after kneading. The amount of the treating agent is not limited insofar as it is equal to or more than an amount calculated based on the area to be covered with the treating agent.

Examples of the surface treating agent include silazanes such as hexamethyldisilazane, silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane, and chloropropyltrimethoxysilane, and organosilicon compounds such as polymethylsiloxane and organohydrogenpolysiloxane. Among these, the silane coupling agents and silazanes are particularly preferred.

The amount of component (E) is 1 to 100 parts by mass, preferably 5 to 60 parts by mass, more preferably 10 to 60 parts by mass, relative to 100 parts by mass of component (A). Component (E) in the aforesaid amount attains a sufficient reinforcing effect and the silicone rubber composition has a desirable viscosity and, therefore, has good workability and processability.

[Other Additives]

The addition-curable silicone rubber composition of the present invention may further comprise other components, if necessary. Examples of the other components include fillers other than the component (E) such as quartz powder, diatomaceous earth, and calcium carbonate; electrically conductive agents such as carbon black, conductive zinc oxide, and metal powder; hydrosilylation controlling agents such as nitrogen-containing compounds, acetylene compounds, phosphorous compounds, nitrile compounds, carboxylates, tin compounds, mercury compounds, and sulfur compound; heat-resistant agents such as iron oxide and cerium oxide; tackifiers, particularly, organosilicon compounds having at least one functional group such as an alkenyl group, an epoxy group, an amino group, a (meth)acryloxy group and a mercapto group, and having no SiH group, such as functional alkoxysilane; and thixotropy-imparting agents. The amount of these components may be determined according to conventional manners and it may be adjusted as long as it does not impair the advantage of the present invention.

The addition-curable silicone rubber composition may be molded or cured according to any conventional manners. An optimum method suited for the purpose may be selected from injection molding, transfer molding, cast molding, and compression molding. The curing may be carried out in heat treatment conditions at from 40 to 230 degrees C. for 3 seconds to 160 minutes for primary vulcanization. If necessary, secondary vulcanization (post curing) at from 40 to 230 degrees C. for 10 minutes to 24 hours may follow.

EXAMPLES

The present invention will be explained in more detail by reference to the Examples and the Comparative Examples, but shall not be limited thereto. In the following Examples and Comparative Examples, "part" or "parts" means part by mass or parts by mass, "room temperature" means 25 degrees C. and "Mn" means an average degree of polymerization.

In the following structural formulas, "Me" is a methyl group and "Ph" is a phenyl group. "Phenyl group amount" herein means percentage (%) of the mole amount of a phenyl group, relative to a total mole amount of the substituents (that is, Me group and Ph group) bonded to a silicon atom of a silicone oil.

Referential Synthesis Example 1

Synthesis of Silicone Oil (D1)

104.70 Grams of methylphenylpolysiloxane having a hydroxymethylphenylsiloxy group each at the both terminals and a polymerization degree of 3 to 6 were reacted at 60 degrees C. for 1.0 hour in the presence of 0.05 g of strontium hydroxide octahydrate, then neutralized with 0.02 g of acetic acid, further reacted with 1.60 g of trimethylchlorosilane and 21.70 g of hexamethyldisilazane to cap the terminals of the obtained compound. Then, the reaction mixture was subjected to stripping to thereby obtain a silicone oil (D1) represented by the following average structural formula and having a phenyl group amount of 39 mol %.

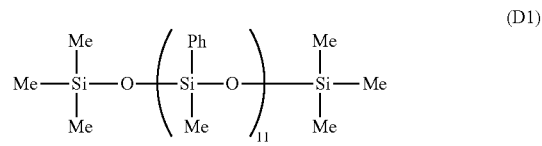

Synthesis Example 2

Synthesis of Silicone Oil (D2)

408.70 Grams of trimethoxymethylsilane and 108.20 g of trimethylsilanol were reacted at 60 degrees C. for 3 hours in the presence of 0.26 g of strontium hydroxide octahydrate, then neutralized with 0.12 g of acetic acid and subjected to distillation to thereby obtain 1,1-dimethoxy-1,3,3,3-tetramethyldisiloxane represented by the following formula, hereinafter referred to as "disiloxane 1".

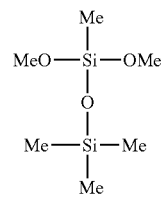

65.28 Grams of methylphenylpolysiloxane having a hydroxymethylphenylsiloxy group each at the both terminals and having a polymerization degree of 3 to 6 and 8.28 g of the disiloxane 1 obtained above were reacted at 60 degrees C. for 2.5 hours in the presence of 0.04 g of strontium hydroxide octahydrate, then neutralized with 0.02 g of acetic acid, further reacted with 0.87 g of trimethylchlorosilane and 11.59 g of hexamethyldisilazane to cap the terminals of the obtained compound. Then, the reaction mixture was subjected to stripping to thereby obtain a silicone oil (D2) represented by the following average structural formula and having a phenyl group amount of 35 mol %.

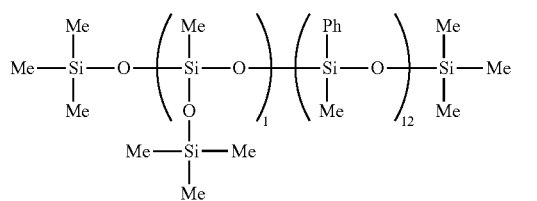

(D2)

Referential Synthesis Example 3

Synthesis of Silicone Oil (D3)

104.70 Grams of methylphenylpolysiloxane having a hydroxymethylphenylsiloxy group each at the both terminals and having a polymerization degree of 3 to 6 were reacted at 60 degrees C. for 2.0 hours in the presence of 0.05 g of strontium hydroxide octahydrate, then neutralized with 0.02 g of acetic acid, further reacted with 1.09 g of trimethylchlorosilane and 14.49 g of hexamethyldisilazane to cap the terminals of the obtained compound. Then, the reaction mixture was subjected to stripping to thereby obtain a silicone oil (D3) represented by the following average structural formula and having a phenyl group amount of 42 mol %.

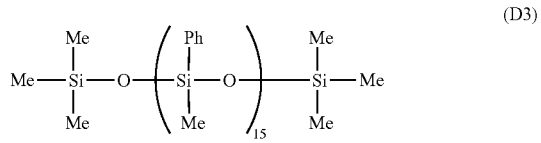

(D3)

Synthesis Example 4

Synthesis of Silicone Oil (D4)

48.96 Grams of methylphenylpolysiloxane having a hydroxymethylphenylsiloxy group each at the both terminals and having a polymerization degree of 3 to 6, and 7.78 g of the disiloxane 1 obtained in Synthesis Example 1 were reacted at 60 degrees C. for 3.0 hours in the presence of 0.03 g of strontium hydroxide octahydrate, then neutralized with 0.01 g of acetic acid, further reacted with 0.44 g of trimethylchlorosilane and 5.80 g of hexamethyldisilazane to cap the terminals of the obtained compound. Then, the reaction mixture subjected to stripping to thereby obtain a silicone oil (D4) represented by the following average structural formula and having a phenyl group amount of 37 mol %.

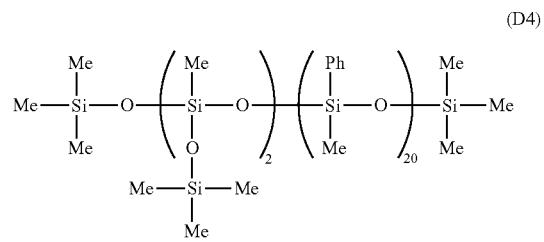

(D4)

Preparation Example 1

60 Parts of dimethylpolysiloxane (A1) whose both terminals are capped with a vinyldimethylsiloxy group, having a viscosity of about 30,000 mPa·s, and having an average degree of polymerization of 750, 40 parts of fine silica powder (E) having a specific BET surface area of about 300 $m^2/g$ (trade name: Aerosil 300, ex Nippon Aerosil), 8 parts of hexamethyldisilazane as a surface treatment agent, and 2 parts of water were mixed in a kneader for one hour. Then, the temperature in the mixture was raised to 150 degrees C. and the mixture was mixed continuously for further 2 hours. The temperature was lowered to 100 degrees C., and further 30 parts of the dimethylpolysiloxane (A1) were added to the mixture, followed by mixing until the mixture became uniform. The mixture thus obtained is named "base compound (I)".

Referential Example 1

To 100 parts of the base compound (I) obtained above were added 19 parts of dimethylpolysiloxane (A1), 0.55 part of a crosslinking agent, i.e., methylhydrogenpolysiloxane (B1) capped, at both ends of the molecular chain, with a trimethylsiloxy group and having an SiH group at a side chain (copolymer of dimethylsiloxane and methylhydrogensiloxane end-capped with trimethylsiloxy groups, and having a degree of polymerization of 46 and an SiH group amount of 0.0055 mol/g), and 0.52 part of methylhydrogenpolysiloxane (B2) capped, at both ends of the molecular chain thereof, with a dimethylhydrogensiloxy group and having an SiH group at a side chain (a copolymer between dimethylsiloxane and methylhydrogensiloxane with both terminals of the copolymer being capped with dimethylhydrogensiloxy groups, the copolymer having a degree of polymerization of 20 and a SiH group amount of 0.0055 mol/g). A ratio of the total moles of the SiH group to the total moles of the vinyl group was 2.0. To the resulting mixture, 0.06 part of ethynylcyclohexanol was added as a reaction controlling agent, followed by stirring at room temperature for 15 minutes. Then, 0.08 part of a toluene solution (C1) of a complex of platinum and 1,3-divinyl-1,1,3,3-tetramethyldisiloxane (1 mass % of a platinum atom) was added and the resulting mixture was stirred at room temperature for 15 minutes (the reaction product thus obtained is named "silicone rubber mixture A").

To 100 parts of the silicone rubber mixture A thus obtained above were added 4.48 parts of the silicone oil (D1) obtained in Synthesis Example 1, followed by mixing to obtain a uniform silicone rubber composition (named "silicone rubber composition 1").

Example 2

To 100 parts of the silicone rubber mixture A prepared in Example 1 were added 4.48 parts of the silicone oil (D2), followed by mixing to obtain a uniform silicone rubber composition (named "silicone rubber composition 2".)

Referential Example 3

To 100 parts of the silicone rubber mixture A prepared in Example 1 were added 4.48 parts of the silicone oil (D3), followed by mixing to obtain a uniform silicone rubber composition (named "silicone rubber composition 3".)

Example 4

To 100 parts of the silicone rubber mixture A prepared in Example 1 were added 4.48 parts of the silicone oil (D4), followed by mixing to obtain a uniform silicone rubber composition (named "silicone rubber composition 4".)

Comparative Example 1

To 100 parts of the silicone rubber mixture A prepared in Example 1 were added 4.48 parts of a silicone oil represented by the following formula (X1) and having a phenyl group amount of 36 mol %, followed by mixing to obtain a uniform silicone rubber composition (named "silicone rubber composition 5".)

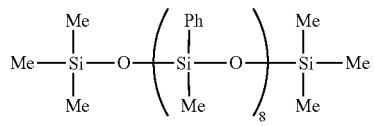

(X1)

Comparative Example 2

To 100 parts of the silicone rubber mixture A prepared in Example 1 were added 4.48 parts of a silicone oil represented by the following formula (X2) and having a phenyl group amount of 44 mol %, followed by mixing to obtain a uniform silicone rubber composition (named "silicone rubber composition 6".)

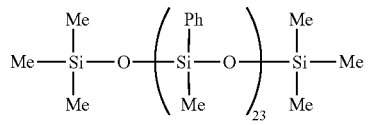

(X2)

Comparative Example 3

To 100 parts of the silicone rubber mixture A prepared in Example 1 were added 4.48 parts of a silicone oil represented by the following formula (X3) and having a phenyl group amount of 29 mol %, followed by mixing to obtain a uniform silicone rubber composition (named "silicone rubber composition 7".)

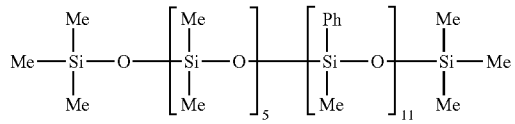

(X3)

Comparative Example 4

To 100 parts of the silicone rubber mixture A prepared in Example 1 were added 4.48 parts of a silicone oil represented by the following formula (X4) and having a phenyl group amount of 19 mol %, followed by mixing to obtain a uniform silicone rubber composition (named "silicone rubber composition 8".)

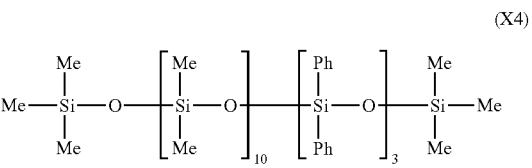

(X4)

Comparative Example 5

To 100 parts of the silicone rubber mixture A prepared in Example 1 were added 4.48 parts of a silicone oil represented by the following formula (X5) and having a phenyl group amount of 21 mol %, followed by mixing to obtain a uniform silicone rubber composition (named "silicone rubber composition 9".)

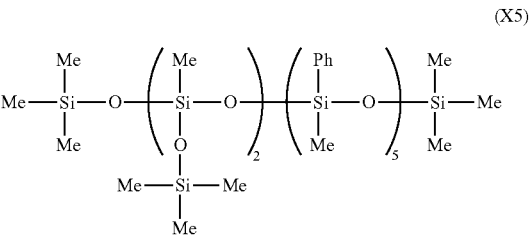

(X5)

Comparative Example 6

To 100 parts of the silicone rubber mixture A prepared in Example 1 was added 4.48 parts of a silicone oil represented by the following formula (X6) and having a phenyl group amount of 0 mol % to obtain a uniform silicone rubber composition (which will be called "silicone rubber composition 10").

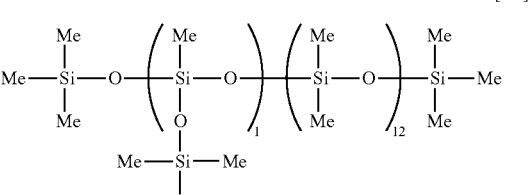

[X6]

The following tests were carried out on the silicone rubber compositions 1 to 10 obtained in the above-described Examples and Comparative Examples. The results are shown in Tables 1 and 2.

<Evaluation of an Oil Bleeding Property of the Silicone Rubber Composition>

The silicone rubber compositions were each press-cured with a thickness of 2 mm at 150 degrees C. for 10 minutes. Then, the resulting cured product was cut into 15 mm×35 mm sheets pieces and the samples were weighted (initial value). The samples were left to stand at room temperature (25 degrees C.) for one day or three days. A bled amount of the oil calculated by reducing the weight after the piping-off from the initial value. The bled amount per surface area of the sample is a measure of an oil bleeding property. The results are shown in Tables 1 and 2.

<Releasability of Silicone Rubber Composition from a Mold>

Releasability from a mold was measured using a peel strength evaluation devices (ex Yoshimizu) and evaluated. Details of the measuring method are as follows.

Each of the silicone rubber compositions (2.8 g) was spread between forces of the measuring device (which has a round flat plate having a diameter of 7 cm placed in a top of the device and a concentric concaved mold as shown in FIG. 1 placed in a bottom of the device) and press-cured at 150 degrees C. and 150 kgf for 3 minutes. Then, the top force was elevated and an applied power (release force) for separating the upper mold from the molded product was determined. The smaller the release force, the more excellent the releasability from the mold. The results are shown in Tables 1 and 2. The mold was made of a steel plate whose surface was treated with nickel.

TABLE 1

|  | Referential Example 1 | Example 2 | Referential Example 3 | Example 4 |
| --- | --- | --- | --- | --- |
| Silicone rubber composition | 1 | 2 | 3 | 4 |
| Silicon oil | D1 | D2 | D3 | D4 |
| Amount of the bled oil after one day, mg/cm$^2$ | 0.13 | 0.04 | 0.04 | 0 |
| Amount of the bled oil after three days, mg/cm$^2$ | 2.44 | 0.13 | 0.74 | 0.05 |
| Release force from a mold, kgf | 9 | 9 | 10 | 10 |

TABLE 2

|  | Com. Ex. 1 | Com. Ex. 2 | Com. Ex. 3 | Com. Ex. 4 | Com. Ex. 5 | Com. Ex. 6 |
| --- | --- | --- | --- | --- | --- | --- |
| Silicone rubber composition | 5 | 6 | 7 | 8 | 9 | 10 |
| Silicon oil | X1 | X2 | X3 | X4 | X5 | X6 |
| Amount of the bled oil after one day, mg/cm$^2$ | 0 | 0 | 0.04 | 0 | 0 | 0 |
| Amount of the bled oil after three days, mg/cm$^2$ | 0 | 0 | 0.21 | 0.26 | 0 | 0 |
| Release force from a mold, kgf | 15 | 14 | 14 | 15 | 15 | 32 |

As shown in Table 1, the molded products (cured products) obtained from the silicone rubber composition of the present invention show good oil-bleeding on the surface, increasing with the passage of time, and also have good releasability from a mold. As shown in Examples 2 and 4, the amount of the bled oil or the starting time of bleeding can be controlled by introducing branched structure in the silicone oil. This makes it possible to provide molded products having desired oil-bleeding properties.

As shown in Table 2, none of the cured products obtained from the compositions of Comparative Examples 1, 2, and 5 containing the silicone oils having a siloxane chain length outside the scope of the present invention show oil-bleeding on the surface even after three days so that the cured products have poor. In addition, these cured products are inferior in releasability because a large power is required for releasing them from a mold (in other words a heavy release power is required).

The cured products obtained from the compositions of Comparative Examples 3 and 4 containing a silicone oil having a siloxane chain length within the scope, but having a dimethylsiloxane unit and a less amount of a phenyl group require a large power to be released from a mold and, thus, are inferior in releasability. In addition, they are inferior in the oil-bleeding property, compared to the compositions of Examples 1 and 3 containing the silicone oil having no branch and having a comparable chain length. This is presumably because the silicone oil having a dimethylsiloxane unit has improved affinity with the base polymer.

Also the cured product obtained from the composition of Comparative Example 6 containing a phenyl group-free silicone oil has poor oil-bleeding and much inferior releasability from a mold. This is presumably because the silicone oil used in Comparative Example 6 has high compatibility with the base polymer so that the latter dissolves in the former.

INDUSTRIAL APPLICABILITY

A cured product obtained from the silicone rubber composition of the present invention has the excellent oil-bleeding property and good releasability from a mold so that it is produced with excellent productivity. The silicone rubber composition of the present invention is therefore useful in a wide-range of applications, such as a material for oil seals, packings, rubber stoppers, and O-rings, in various fields such as building materials, electric or electronic parts, automobile parts, and OA device parts, or grommets for diaphragms or distributors.

The invention claimed is:

1. An addition-curable silicone rubber composition comprising the following components (A) to (D):
    (A) 100 parts by mass of an organopolysiloxane having at least two alkenyl groups each bonded to a silicon atom,
    (B) 0.2 to 20 parts by mass of an organohydrogenpolysiloxane having at least two hydrogen atoms each bonded to a silicon atom, (C) a catalytic amount of a platinum group metal catalyst, and
(D) 1 to 10 parts by mass of a silicone oil represented by the following formula (1):

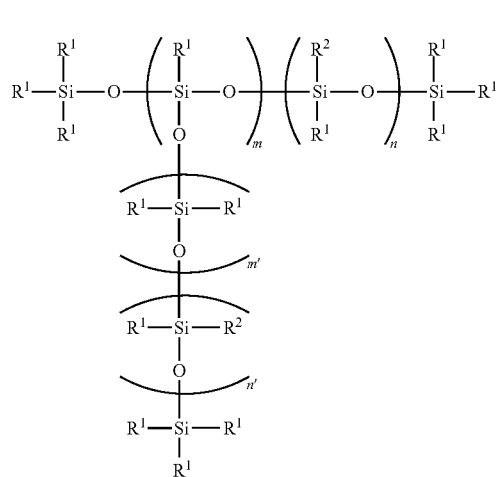

(1)

wherein $R^1$ is, independently of each other, an unsubstituted monovalent hydrocarbon group having 1 to 10 carbon atoms, $R^2$ is, independently of each other, a monovalent aromatic hydrocarbon group having 6 to 12 carbon atoms, the amount of the monovalent aromatic hydrocarbon group is at least 35 mol % and less than 50 mol %, relative to a total amount of all substituents each bonded to a silicon atom, that is, all of $R^1$ and $R^2$, m is an integer of from 1 to 3, m' is an integer of from 0 to 3, n' is an integer of from 0 to 3, n is an integer of from 10 to 20, and m+m'+n+n' is in a range of from 10 to 22.

2. The addition-curable silicone rubber composition according to claim 1, wherein the silicone oil (D) is represented by the following general formula (1'):

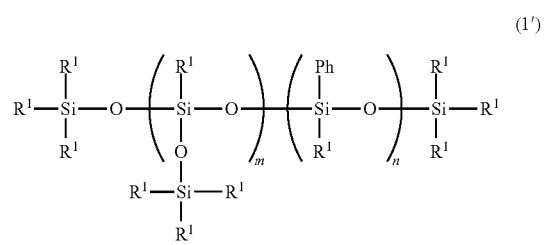

(1')

wherein $R^1$ is as defined above, Ph is a phenyl group, the amount of the phenyl group is at least 35 mol % and less than 50 mol %, relative to a total amount of the substituent each bonded to a silicon atom, that is, all of $R^1$ and Ph, m and n are as defined above, and m+n is in a range of from 10 to 22.

3. The addition-curable silicone rubber composition according to claim 1 or 2, further comprising 1 to 100 parts by mass of a reinforcing filler (E), relative to 100 parts by mass of component (A).

4. The addition-curable silicone rubber composition according to claim 3, wherein component (E) is fumed silica having a specific surface area of 50 $m^2/g$ or larger as determined according to the BET method.

5. A cured product obtained by curing the addition-curable silicone rubber composition according to claim 1.

* * * * *